United States Patent
Rivard (10) Patent No.: US 8,709,557 B2
(45) Date of Patent: Apr. 29, 2014

(54) SUPPORT CORE FOR COLD SHRINK TUBE

(71) Applicant: 3M Innovative Properties Company, St. Paul, MN (US)

(72) Inventor: Nicholas G. Rivard, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/718,201

(22) Filed: Dec. 18, 2012

(65) Prior Publication Data

US 2013/0164475 A1    Jun. 27, 2013

Related U.S. Application Data (60) Provisional application No. 61/579,315, filed on Dec. 22, 2011.

(51) Int. Cl.
  *B29D 22/00*    (2006.01)
  *B32B 1/08*    (2006.01)
  *H02G 15/18*    (2006.01)

(52) U.S. Cl.
  CPC .............. *B32B 1/08* (2013.01); *H02G 15/1833* (2013.01)
  USPC .......................... 428/34.1; 428/34.9; 428/36.9

(58) Field of Classification Search
  CPC .............................. B32B 1/08; H02G 15/1833
  USPC .............. 428/34.2, 34.9, 36.9, 34.1; 206/364; 174/DIG. 9, 135
  See application file for complete search history.

(56) References Cited

U.S. PATENT DOCUMENTS

| | | | |
|---|---|---|---|
| 3,562,079 A * | 2/1971 | Steel | 428/222 |
| 5,670,223 A | 9/1997 | Sadlo et al. | |
| 5,670,233 A * | 9/1997 | Roush et al. | 428/99 |
| 5,925,427 A | 7/1999 | Sadlo et al. | |
| 7,234,233 B2 * | 6/2007 | Fong et al. | 29/842 |
| 7,549,270 B2 * | 6/2009 | Rowe et al. | 53/430 |
| 2005/0069657 A1 * | 3/2005 | Suzuki et al. | 428/34.1 |
| 2005/0069659 A1 * | 3/2005 | McMahon et al. | 428/34.2 |
| 2006/0278547 A1 * | 12/2006 | Rowe et al. | 206/364 |
| 2009/0056101 A1 * | 3/2009 | Cuddy et al. | 29/456 |

FOREIGN PATENT DOCUMENTS

| | | |
|---|---|---|
| EP | 0424090 | 4/1991 |
| EP | 1860749 | 11/2007 |
| JP | 1993-36917 | 7/1996 |
| JP | 2000102156 | 4/2000 |
| WO | 03047062 | 6/2003 |

OTHER PUBLICATIONS

PCT/US2012/070303, Invitation to Pay Additional Fees, Aug. 9, 2013.

* cited by examiner

*Primary Examiner* — N. Edwards
(74) *Attorney, Agent, or Firm* — Gregg H. Rosenblatt (57) ABSTRACT

Provided is an article comprising a helically wound ribbon forming a tubular support core, the ribbon having first and second edges wherein adjacent first and second edges comprise one or more bonds along the length of the tubular support core; wherein the strength of the one or more bonds varies along the length of the tubular support core.

20 Claims, 5 Drawing Sheets

SUPPORT CORE FOR COLD SHRINK TUBE

CROSS REFERENCE TO RELATED APPLICATION

This application claims the benefit of U.S. Provisional Patent Application No. 61/579,315 filed Dec. 22, 2012

TECHNICAL FIELD

This invention relates generally to a removable tubular support core assembly for the support of an elastically shrinkable sleeve to be applied, for example, as a covering around an electrical cable.

BACKGROUND

Elastomeric covers or sleeves and removable support core assemblies are known in the art and are particularly useful in the electrical distribution industry. The assembly is typically referred to as cold shrink tubing to differentiate it from polymeric tubing which may be shrunk by the application of heat.

Figure 1:
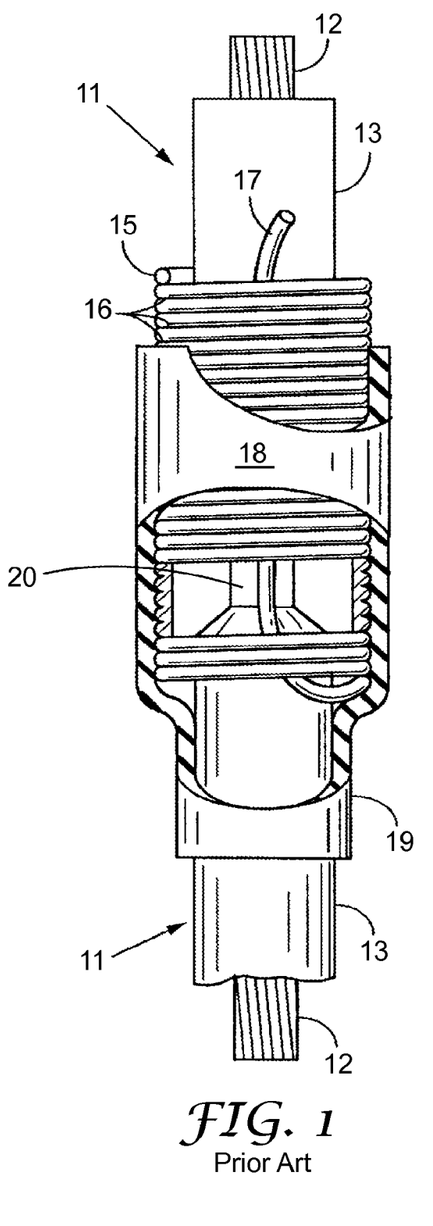
FIG. 1 is a plan view of a cable, a support core, and cold shrink tube (with portion cut away) of the prior art.

FIG. 1 illustrates a typical use for, and construction of, a cold shrink tube joint or splice assembly and shows two cable-ends 11 comprising stranded conductors 12 and insulating coverings 13. The insulating covering 13 is cut away to expose an end of the conductors 12, which ends are then joined together in end-to-end configuration by suitable means 20 which may typically consist of a compressed or indented metal sleeve or a close-fitting metal tube with set-screw retainers. The joint or splice may be covered with insulating mastic or tape, omitted here for clarity of illustration.

The cold shrink tube assembly, which includes a cold shrink tube 18 in a radially expanded or stretched condition on the support core 15, is slipped over one of the cable ends prior to joining the two conductor ends to create a splice. After the splice is completed, the assembly is slid into position over the splice area and the support core is removed to permit the cold shrink tube to contract and form a tight fit around the splice. The support core 15 may be a unitary tubular core that may be a solid core helically grooved along its entire length or may be a helically wound and bonded continuous ribbon, the groove or bond line 16 permitting the support core 15 to be pulled out as a continuous strip 17 which is removed through the bore, i.e., from between the support core 15 and the cable 11. As the strip 17 is progressively withdrawn, the cold shrink tube 18 contracts around the cable as at end 19 to form a closely conforming and tightly retained protective covering.

Figure 2:
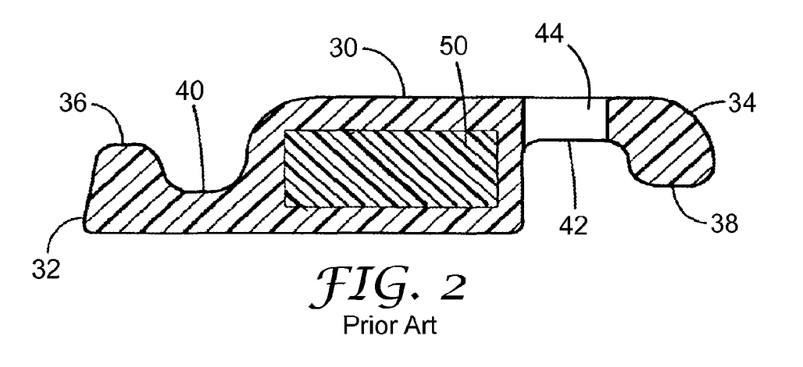
FIG. 2 is a cross-sectional view of a ribbon used to manufacture a support core according to the prior art.
Figure 3:
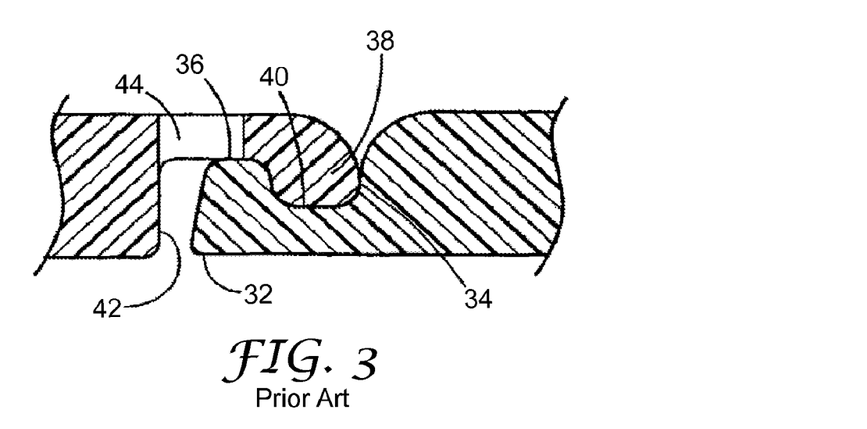
FIG. 3 is a cross-sectional view of portions of two ribbons of FIG. 2 after they have been joined.

One type of ribbon 30 includes edges 32 and 34 which interlock, as shown in FIGS. 2 and 3, when recesses 40 and 42 receive coupling projections 36 and 38 as the ribbon 30 is helically wound to form a tubular core. The interlocked edges 32 and 34 may be joined by such means as adhesives, heat welding, ultrasonic welding, or solvent welding, such that the hoop strength of the support core 15 sufficiently opposes the compressive force of the cold shrink tube 18. The hoop strength of the core is derived primarily from the strength of the ribbon 30 and secondarily by the strength of the joints that connect the ribbon 30 along the circumference of the support core 15. The joints are typically sufficiently strong so that a high force must be consistently applied to the strip 17 in order to break the joints and remove the strip 17. Repetitive motion is required to break all of the joints along the length of the support core 15 and to guide the strip 17 out of the cold shrink tube 18.

The ribbon 30 may be formed with regularly spaced perforations 44, each extending from the bottom of recess 42 through the ribbon 30 to the top of the ribbon 30. If the strength of the joints between edges 32 and 34 is high, separation of the support core 15 into the strip 17 will occur along the perforation 44. This is often not preferred because the separated perforation points can produce a rough edge on strip 17. Conversely, if the joints are not strong enough, the hoop strength of the tubular support core 15 will be too weak to support the cold shrink tube 18 and the tubular support core 15 will collapse, or "crash," uncontrollably.

SUMMARY

The support core of the present invention may be manufactured from a ribbon adapted to be joined to itself along its edges to form a tube of helically wound ribbon or from a solid tube helically grooved along its entire length such that it effectively also forms a tube of helically wound ribbon. References herein to a support core formed from a ribbon are intended to refer to both types of support cores, unless otherwise indicated.

In contrast to prior art support cores, the support cores of the present invention have bonds of varying strength along the edges of adjacent ribbon sections. Accordingly, the support cores of the present invention have some sections that have a low bond strength and may be unwound with a small amount of pulling force on the end of the support core ribbon and other sections having high bond strength that require more pulling force to unwind the ribbon. This feature provides cold shrink tube assembly support cores having variable yet predictable removal characteristics which improves the ease of removing the support core while still controlling the rate of recovery, i.e., the rate of shrinking, of the cold shrink tube 18, even in cold shrink assemblies with very high levels of compressive force.

The application of cold shrink tubes to electric wire or cable splice areas is illustrative, and although the invention will be described herein primarily in terms of devices and procedures adapted particularly therefore, it is not to be construed as limited thereto, being equally applicable, for example, in the application of corrosion-preventing cold shrink tubes to welded pipe joints.

At least one embodiment of the present invention provides an article comprising a helically wound ribbon forming a tubular support core, the ribbon having first and second edges wherein adjacent first and second edges comprise one or more bonds along the length of the tubular support core; wherein the strength of the one or more bonds varies along the length of the tubular support core.

At least one embodiment of the present invention provides an article comprising an elastomeric sleeve supported in a highly stretched condition on a length of hollow tubular support core; and a helically wound ribbon forming the tubular support core, the ribbon having first and second edges wherein adjacent first and second edges comprise one or more bonds along the length of the tubular support core; wherein the strength of the one or more bonds varies along the length of the tubular support core.

As used in this specification:

"bond" means a location at which two pieces of material are affixed to each other;

"bond strength" means the extent to which two adjacent ribbon sections are affixed to each other as determined by the relative amount of force required to separate the affixed sections;

"joint" means a discrete point or area at which two adjacent ribbon sections of a support core are affixed to each other;

"seam" means a continuous affixture of two adjacent ribbon sections of a support core;

"helically wound ribbon" refers to the continuous band of material that forms the general structure of the support core regardless of whether the support core is formed from a long, thin band of material that is wound and fixed to form a rigid support core or the support core is formed from a solid tube that has a groove or other separating means formed in the solid tube.

An advantage of at least one embodiment of the present invention is that the variability in bond strength makes it easier for an operator to remove the support core when installing the cold shrink tube. For example, in embodiments of the invention on which sections of strong and weak bonds are alternated, the operator is able to initiate the unwinding of a portion of the support core by pulling on the support core ribbon to break the strong bonds, then when the section of weak bonds is reached, the unwinding will self-propagate due to the compressive force placed on the support core by the cold shrink tube. The self-propagating unwinding will terminate when another section of strong bonds is reached. In this manner, the unwinding process is easier but still controllable.

An advantage of at least one embodiment of the invention is that in an embodiment in which perforations are included in the ribbon, if the bond strengths (both strong and weak) are made such that the ribbon sections will separate at the bond sites rather than at the perforation sites, the unwound ribbon will have a smooth edge, which is desirable.

The above summary of the present invention is not intended to describe each disclosed embodiment or every implementation of the present invention. The detailed description that follows below more specifically illustrates embodiments of the invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to one another. Like reference numerals designate correspondingly similar parts.

DETAILED DESCRIPTION

In the following description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It will also be understood that features of the various exemplary embodiments described herein may be combined with each other, unless specifically noted otherwise.

In various embodiments of the present invention, adjacent sections of support core ribbon may be affixed to each other by any suitable means such as by mechanical means, by adhesives, by various welding methods such as heat welding, ultrasonic welding, solvent welding, and mechanical welding. Creating the low bond strength and high bond strength sections of the support core of the present invention may be done in any suitable manner such as by varying the time, or area over which, any of the foregoing bonding methods are applied to sections of the support core.

The bonds of the present invention may be in the form of discrete joints or continuous seams. The bond strength of a seam may be varied along its length in a variety of ways. For example, if a support core of the present invention is formed by creating a helical groove in a solid support core, the depth of the groove could be varied to produce sections having differing amounts of material remaining in the groove, thereby requiring different amounts of force to separate the sections of the support core ribbon along the groove. If a continuous mechanical bond is used, such as interlocking ribbon edges, the shape of the interlocking portions may be varied along the length of the seam to create sections that are more easily separated and areas that are more difficult to separate. If a seam is created using an adhesive, the amount and/or type of adhesive applied may be varied along the length of the seam.

The bond strength of a series of adjacent joints may also be varied to create sections of high and low bond strength. For example, a perforation may be used to create the helical ribbon instead of a groove; i.e., there may be a helical pattern consisting of slits extending all the way through the support core alternating with completely, or partially, intact areas. To vary the bond strength using such a perforation pattern, the lengths of the slits and the lengths of the intact areas may be varied. In some embodiments, the lengths of both the slits and intact areas may be varied, while in other embodiments, the length of the slits or intact areas may be held constant while the length of the other feature is varied. If an adhesive is used to form joints, the amount of adhesive deposited or the type of adhesive used may be varied. If a welding process is used, the length of weld time or other aspects of the process may be varied. If a mechanical structure is used, such as discrete interlocking features along the ribbon edges, the shape of the interlocking features may be varied to create sections of joints that are more easily separated and sections of joints that are more difficult to separate.

Figure 7A:
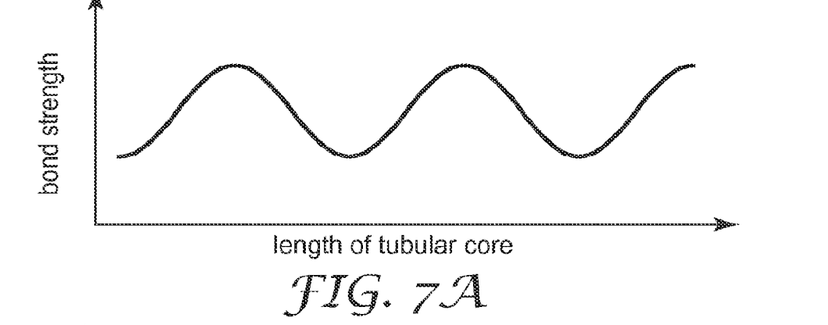
FIG. 7A is an example of a sine wave pattern according to one embodiment of the present invention.
Figure 7B:
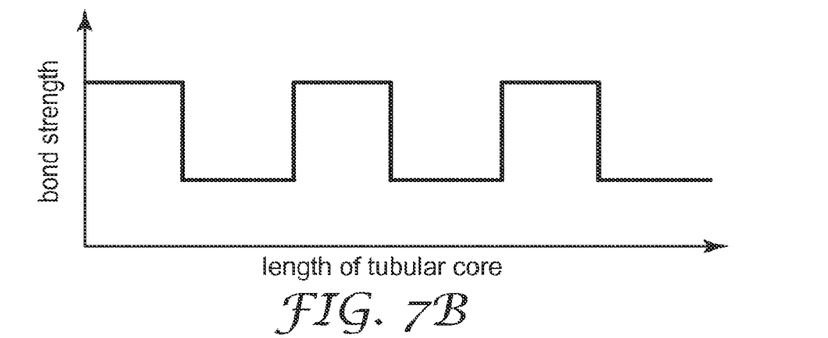
FIG. 7B is an example of a square wave pattern according to one embodiment of the present invention.
Figure 7C:
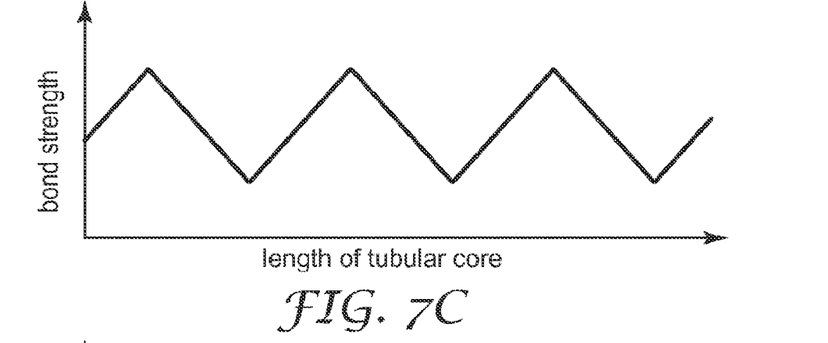
FIG. 7C is an example of a triangular wave pattern according to one embodiment of the present invention.
Figure 7D:
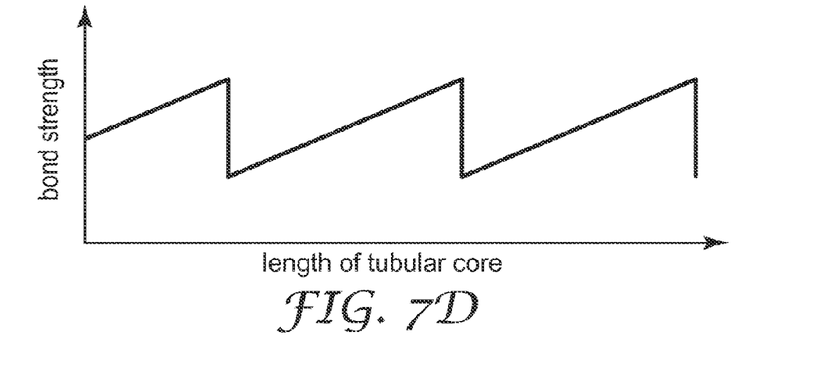
FIG. 7D is an example of a sawtooth wave pattern according to one embodiment of the present invention.

The strengths of the bonds, whether they are joints or seams, may be varied, e.g., in wave form patterns. For example, a sine wave (FIG. 7A) or triangular wave variation pattern (FIG. 7C) can be achieved by having bonds (joint or seam sections) that form a repeating pattern of strong/intermediate/weak/intermediate bond strengths. Other suitable bond strength wave patterns may include square wave patterns, in which sections of strong and weak bonds are alternated (FIG. 7B), or a sawtooth wave in which sections of strong/intermediate/weak bonds are repeated in that order (FIG. 7D). The wave pattern can be adjusted with respect to amplitude and/or frequency. In some embodiments, the variation in bond strength may be continuous along the circumference of the support core such that, e.g., the bond strength of the seam or joints decreases constantly from one end to the other. Typically, such a bond pattern would only be used in a short support core because if the bond strength is low over a large area of the support core, it will not be able to withstand the compressive force of the cold shrink tube and the cold shrink tube will shrink down before the portion of the support core under the shrunk down portion can be removed.

Figure 4A:
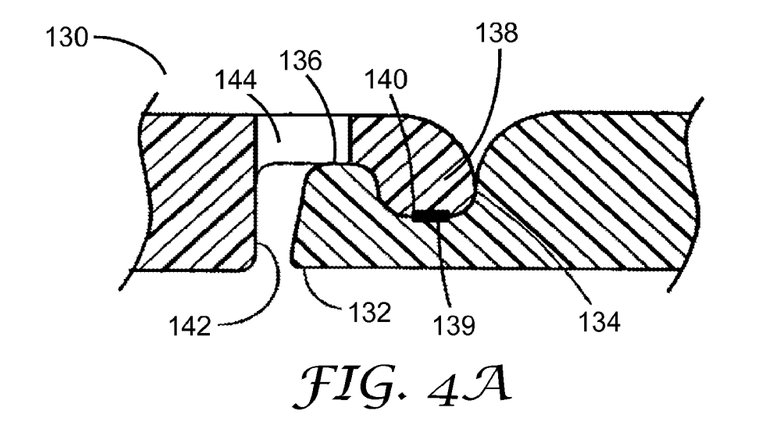
FIG. 4A is a cross-sectional view of a ribbon illustrating an aspect of an embodiment of the present invention.
Figure 4B:
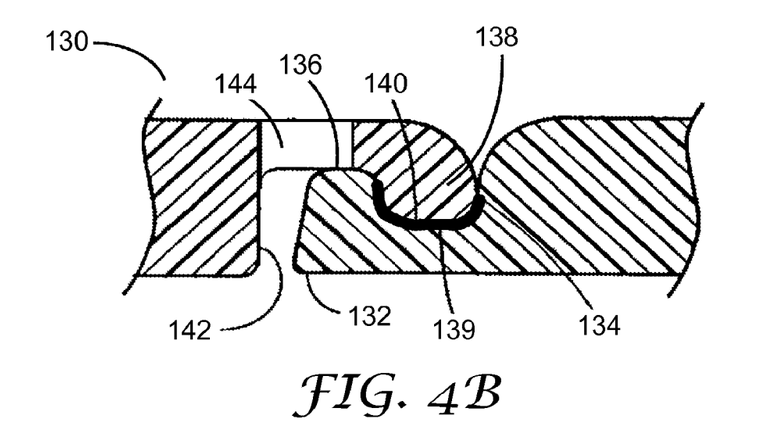
FIG. 4B is a cross-sectional view of a ribbon illustrating an aspect of an embodiment of the present invention.

FIGS. 4A and 4B illustrate aspects of an embodiment of the present invention in which a support core similar to that of FIGS. 2 and 3 is made with the features of the present invention. Support core 130 includes joints such as joint 139. Joint 139 is a point at which coupling projection 138 of ribbon edge 134 and recess 140 of ribbon edges 132 are bonded. For a joint having a weak bond, the interfacing (touching) portions of coupling projection 138 and recess 140 might be bonded only at a single location comprising a relatively small area such as is illustrated in FIG. 4A, in which only the tip of coupling projection 138 and the floor of recess 140 are bonded. For a joint having a strong bond, the interfacing (touching) portions of coupling projection 138 and recess 140 might be bonded at two or more discrete locations, or the area of a single bonded location may be relatively large as is illustrated in FIG. 4B in which the bonded portions of coupling projection 136 and recess 140 extends along the side surfaces of both projection 138 and recess 140.

Figure 5:
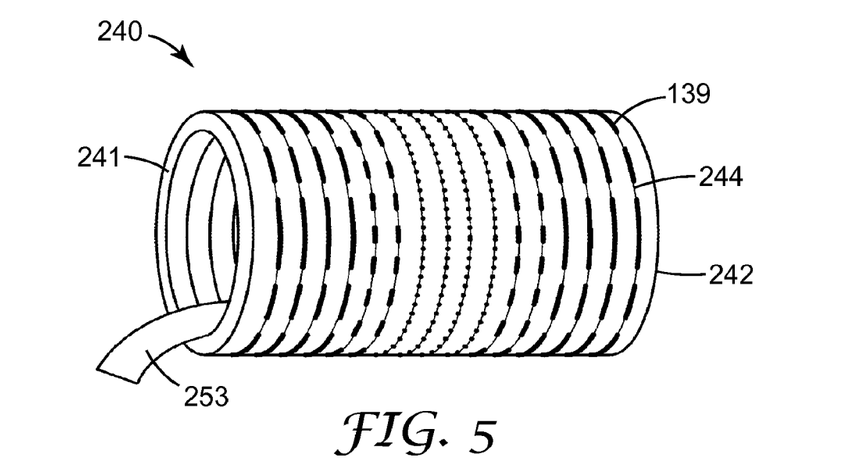
FIG. 5 is a side view of a support core according to one embodiment of the present invention.

In the embodiment illustrated in FIG. 5, support core 240 is a spiral wound ribbon support core including a first end 241 opposite a second end 242 and includes a tab 253 configured to unwind or unravel support core 240 from end 242 to end 241. In this embodiment of the present invention the strengths of joints 139 are varied by modifying the length of the joints while keeping the cross-sectional area (i.e., the darkened area in FIG. 5) of the interfacial bond of the joints and the spacing between the joints constant. The lengths of the joints near the ends 241 and 242 are long in comparison to the length of joints interior to ends 241 and 242, which include sections of medium length joints and a central section of short length joints. The strengths of the joint in this embodiment vary in essentially a sine wave or triangular wave pattern. As tab 253 is pulled and support core 240 is unwound from end 242 to end 241, the section with long joint will have higher bond strength and will require more force to separate, the medium length joints will require less force to separate, and the short joints in the center section will require even less force to separate and will unwind easily. Other suitable joint strength patterns may include square wave patterns, in which sections of long and short joints are alternated, or a sawtooth wave in which sections of long, medium, and short joints are repeated in that order. In some embodiments, the weaker bonds, such as those in the center portion of support core 240 in FIG. 5, are designed to collapse under the force of the stretched cold shrink tube (not shown) loaded onto support core 240 once the sections having long and medium joints have been unwound.

In some embodiments comprising a continuous seam instead of discrete joints, cross-sectional area of the interfacial bond of the seam may be varied along the length of the seam. As mentioned previously, methods such as varying the amount of an applied adhesive or varying the aspects of a welding process can be used to achieve the desired variation.

Figure 6:
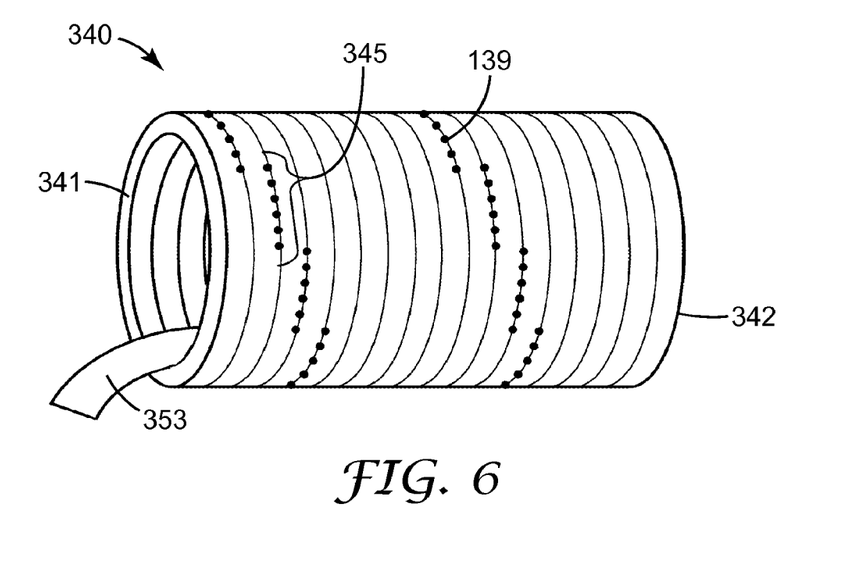
FIG. 6 is a side view of a support core according to one embodiment of the present invention.

As illustrated in FIG. 6, in other embodiments, there may be intermittent off-set sections 345 of strong joints 139 between the remaining sections which comprise weaker joints around the circumference of tube 340. In addition, the amount of off-set of adjacent sections may be varied such that the stronger sections are directly adjacent to each other, overlap to a large or small extent, or do not overlap at all. In some embodiments the strong joint sections may be equally spaced from each other and in other embodiments, the spacing may be intermittent. In at least one embodiment of the present invention, about $1/10^{th}$ of the circumference of a section of ribbon comprises strong joints and about $9/10^{th}$ of the circumference of the same section of ribbon comprises weak joints or no joints. In at least one embodiment of the present invention, there may be two, three, or more circumferential revolutions of ribbon between joints. This may be varied as desired for the particular support core and application. For example, the hoop strength of a support core typically decreases as the diameter of the support core increases. Accordingly, it may be desirable in some embodiments to have larger areas of strong joints for support cores having larger diameters. The material from which the support core is made as well as the structure of the support core and the compressive strength of the cold shrink tube, will also influence the desired pattern and strength level of the joints. As a whole, the joints 139 provide sufficient strength in the finished support core to support the cold shrink in an expanded state.

In embodiments of the present invention, the ribbon 130 may be made of any polymeric material suitable for the aforementioned bonding techniques and possessing sufficient strength to support the sleeve. Suitable materials include, but are not limited to, thermoplastic materials, preferably polyolefins. If a support core of the present invention has a general structure similar to that of the prior art support core of FIG. 2 the body of ribbon 130 may be provided with a support member similar to support member 50 shown in FIG. 2. The support member may extend longitudinally along the length of ribbon 130. The support member preferably has greater strength and temperature resistance than the material forming the remainder of ribbon 130, such that the inclusion of the support member in ribbon 130 causes a support core formed from ribbon 130 to exhibit increased resistance to premature collapse when subjected to high pressures from large diameter stretched cold shrink tubes and when stored in high temperature conditions. The support member is preferably a thermoplastic material, such as ABS resin (a terpolymer based on acrylonitrile, butadiene and styrene), while the remainder of ribbon 130 is formed of a thermoplastic material such as a polyolefin resin. Other suitable materials for the support member include, for example, a modified PPO (polyphenylene oxide) resin. The support member is preferably coextruded with the body of ribbon 130. However, other methods of forming ribbon 130 with the support member may be recognized by those skilled in the art, and are contemplated to be within the scope of the present invention.

Although specific embodiments have been illustrated and described herein, it will be appreciated by those of ordinary skill in the art that a variety of alternate and/or equivalent implementations may be substituted for the specific embodiments illustrated and described without departing from the scope of the invention. This application is intended to cover any adaptations or variations of tubular support core assemblies as discussed herein. Therefore, it is intended that this invention be limited only by the claims and the equivalents thereof.

What is claimed is:

1. An article comprising:
   a helically wound ribbon forming a tubular support core, the ribbon having first and second edges wherein adjacent first and second edges comprise a plurality of bonds along the length of the tubular support core;
   wherein the plurality of bonds each has a bond strength; and
   wherein the bond strength of the plurality of bonds varies along the length of the tubular support core.

2. The article of claim 1, wherein the type of bond is selected from the group consisting of mechanical structures, adhesives, and welds.

3. The article of claim 1, wherein the bond strength varies in a wave form pattern along the length of the tubular support core.

4. The article of claim 3 wherein the wave form pattern is selected from the group consisting of a sine wave, a square wave, and a sawtooth wave.

5. The article of claim 1, wherein the bond strength varies continuously along the length of the tubular support core.

6. The article of claim 3 wherein the bond strength pattern comprises sections of strong bonds alternating with sections of weak bonds.

7. The article of claim 6 wherein the sections of strong bonds comprise about $1/10^{th}$ of a circumferential portion of the ribbon and the sections of weak bonds comprise the remainder of the same circumferential portion of the ribbon.

8. The article of claim 6 wherein the sections of strong bonds are off-set from each other along the length of the tubular support core.

9. The article of claim 1 wherein the plurality of bonds comprise discrete joints.

10. The article of claim 1 wherein the plurality of bonds comprise a continuous seam.

11. An article comprising:
    an elastomeric sleeve supported in a highly stretched condition on a length of hollow tubular support core; and
    a helically wound ribbon forming the tubular support core, the ribbon having first and second edges wherein adjacent first and second edges comprise a plurality of bonds along the length of the tubular support core;
    wherein the plurality of bonds each has a bond strength; and
    wherein the bond strength of the plurality of bonds varies along the length of the tubular support core.

12. The article of claim 11, wherein the type of bond is selected from the group consisting of mechanical structures, adhesives, and welds.

13. The article of claim 11, wherein the bond strengths vary in a wave form pattern along the length of the tubular support core.

14. The article of claim 13 wherein the waveform pattern is selected from the group consisting of a sine wave pattern, a square wave pattern, a triangular wave pattern, and a sawtooth wave pattern.

15. The article of claim 11 wherein the bond strengths vary continuously along the length of the tubular support core.

16. The article of claim 13 wherein the bond strength pattern comprises sections of strong bonds alternating with sections of weak bonds.

17. The article of claim 16 wherein the sections of strong bonds comprise about $1/10^{th}$ of a circumferential portion of the ribbon and the sections of weak bonds comprise the remainder of the same circumferential portion of the ribbon.

18. The article of claim 16 wherein the sections of strong bonds are off-set from each other along the length of the tubular support core.

19. The article of claim 11 wherein the plurality of bonds comprise discrete joints.

20. The article of claim 11 wherein the plurality of bonds comprise a continuous seam.

* * * * *

UNITED STATES PATENT AND TRADEMARK OFFICE
CERTIFICATE OF CORRECTION

| | | |
|---|---|---|
| PATENT NO. | : 8,709,557 B2 | Page 1 of 1 |
| APPLICATION NO. | : 13/718201 | |
| DATED | : April 29, 2014 | |
| INVENTOR(S) | : Nicholas Rivard | |

It is certified that error appears in the above-identified patent and that said Letters Patent is hereby corrected as shown below:

In the Specification

Column 1
Line 7, Delete "Dec. 22, 2012" and insert -- Dec. 22, 2011. --, therefor.

Column 3
Line 49, Delete "art;" and insert -- art. --, therefor.

Signed and Sealed this
Thirtieth Day of September, 2014

Michelle K. Lee
*Deputy Director of the United States Patent and Trademark Office*